United States Patent
Kagan et al.

(10) Patent No.: US 7,801,027 B2
(45) Date of Patent: Sep. 21, 2010

(54) AUTO-NEGOTIATION BY NODES ON AN INFINIBAND FABRIC

(75) Inventors: Michael Kagan, Yokneam (IL); Alon Webman, Tel Aviv (IL); Ido Bukspan, Yehud (IL); Benny Koren, Zichron Yaakov (IL); Hillel Chapman, Ein Haemek (IL); Ariel Shachar, Jerusalem (IL)

(73) Assignee: Mellanox Technologies Ltd., Yokneam (IL)

( * ) Notice: Subject to any disclaimer, the term of this patent is extended or adjusted under 35 U.S.C. 154(b) by 236 days.

(21) Appl. No.: 11/847,360

(22) Filed: Aug. 30, 2007

(65) Prior Publication Data

US 2008/0219150 A1 Sep. 11, 2008

Related U.S. Application Data

(60) Provisional application No. 60/823,901, filed on Aug. 30, 2006.

(51) Int. Cl.
  *H04L 1/00* (2006.01)
(52) U.S. Cl. ...................................................... 370/218
(58) Field of Classification Search .................. 370/218
  See application file for complete search history.

(56) References Cited

U.S. PATENT DOCUMENTS

2004/0179518 A1* 9/2004 Bruckman et al. .......... 370/358

* cited by examiner

*Primary Examiner*—Jason E Mattis
*Assistant Examiner*—Stephen J Clawson
(74) *Attorney, Agent, or Firm*—Mark M. Friedman (57) ABSTRACT

A method and system for digital communication wherein nodes exchange messages at a first data rate in order to coordinate testing at a second, higher data rate. After testing is completed, the nodes exchange test results at the first data rate, and if conditions are satisfactory for operation at the second data rate user data are transmitted at the second data rate. Otherwise, user data are transmitted at the first data rate.

10 Claims, 2 Drawing Sheets

AUTO-NEGOTIATION BY NODES ON AN INFINIBAND FABRIC

This is a continuation-in-part of U.S. Provisional Patent Application No. 60/823,901, filed Aug. 30, 2006

FIELD AND BACKGROUND OF THE INVENTION

The present invention relates to a digital communication method, and, more particularly, to a digital communication method operative to provide each node of a pair of nodes of a digital communication system, such as an InfiniBand fabric, with sufficient information about the other node of the pair to facilitate the setting of parameters of that node so as to facilitate substantially optimized communication between the two nodes.

The present invention addresses the problem of automatically connecting nodes, such as those of an InfiniBand fabric, with each other so as to take advantage of the capabilities of each node as much as possible in view of the limitations of the nodes and their environment. In particular, it is desirable to make use of Double Data Rate (DDR) transmission if both nodes are capable of such, and otherwise use Single Data Rate (SDR) transmission. Additionally, it is desirable to assess the quality of the communication link for a variety of combinations of transmission and reception parameters for each direction of communication, and then select the best such combination for each direction for the transmission of user data.

Active Cable is a transmission medium that behaves differently from ordinary copper cabling. Although transmission and reception parameter settings appropriate for Active Cable can be used for copper cabling, and vice versa, this leads to a subtle degradation of performance. The present invention provides the ability to automatically distinguish Active Cable from copper cable.

There is thus a widely recognized need for, and it would be highly advantageous to have, a method of digital communication that automatically selects DDR, if possible, and otherwise selects SDR, and also automatically selects substantially optimal transmission and reception parameters for each direction of data transmission.

SUMMARY OF THE INVENTION

According to the present invention there is provided method of digital communication including the steps of: (a) establishing a digital communication session between a first node and a second node at a predetermined first data rate; (b) the first node transmitting a first message to the second node, the first message including an indication of whether the first node is capable of operating at a predetermined second data rate; (c) the second node transmitting a second message to the first node, the second message including an indication of whether the second node is capable of operating at the second data rate; (d) if the first message is received by the second node and the indication of whether the first node is capable of operating at the second data rate is negative, the second node operating at the first data rate; (e) if the first message is received by the second node and the indication of whether the first node is capable of operating at the second data rate is positive, the second node transmitting to the first node a third message, the third message including an indication of whether the second node is capable of operating at the second data rate, the third message further including an acknowledgement code; (f) if the second message is received by the first node and the indication of whether the second node is capable of operating at the second data rate is negative, the first node operating at the first data rate; (g) if the second message is received by the first node and the indication of whether the second node is capable of operating at the second data rate is positive, the first node transmitting to the second node a fourth message, the fourth message including an indication of whether the first node is capable of operating at the second data rate, the fourth message further including an acknowledgement code; (h) if the third message is received by the first node, and if the indication of whether the second node is capable of operating at the second data rate is positive, the first node transmitting to the second node, at the second data rate, a fifth message; (i) if the fourth message is received by the second node, and if the indication of whether the first node is capable of operating at the second data rate is positive, the second node transmitting to the first node, at the second data rate, a sixth message; (h) if the first node has received the second message and the indication of whether the second node is capable of operating at the second data rate is positive, and, subsequently, a link failure is detected by the first node, the first node transmitting to the second node, at the second data rate, the fifth message; (k) if the second node has received the first message and the indication of whether the first node is capable of operating at the second data rate is positive, and, subsequently, a link failure is detected by the second node, the second node transmitting to the first node, at the second data rate, the sixth message; (l) if the first node has received the sixth message, and the first node has determined that no portion of the sixth message satisfies a first predetermined quality criterion, the first node transmitting to the second node, at the first data rate, a seventh message, the seventh message including an indication that the first node has not successfully received the sixth message, the first node continuing communication with the second node at the first data rate; (m) if the first node has received the sixth message, and the first node has determined that at least one portion of the sixth message satisfies the first quality criterion, the first node transmitting to the second node, at the first data rate, an eighth message, the eighth message including an indication that the first node has successfully received the sixth message; (n) if the second node has received the fifth message, and the second node has determined that no portion of the fifth message satisfies a second predetermined quality criterion, the second node transmitting to the first node, at the first data rate, a ninth message, the ninth message including an indication that the second node has not successfully received the fifth message, the second node continuing communication with the first node at the first data rate; (o) if the second node has received the fifth message, and the second node has determined that at least one portion of the fifth message satisfies the second quality criterion, the second node transmitting to the first node, at the first data rate, a tenth message, the tenth message including an indication that the second node has successfully received the fifth message; (p) if the eighth message is received by the second node and the eighth message includes an indication that the first node has received the sixth message successfully, the second node transmitting to the first node an eleventh message, the eleventh message including an indication that the second node has successfully received the fifth message, the eleventh message further including an acknowledgement code; (q) if the tenth message is received by the first node and the tenth message includes an indication that the second node has received the fifth message successfully, the first node transmitting to the second node a twelfth message, the twelfth message including an indication that the first node has successfully received the sixth message, the twelfth message further including an acknowledgement code;

(r) if the eleventh message is received by the first node, and if the eleventh message includes an indication that the second node has successfully received the fifth message, the first node communicating with the second node at the second data rate; (s) if the twelfth message is received by the second node, and if the twelfth message includes an indication that the first node has successfully received the sixth message, the second node communicating with the first node at the second data rate; (t) if the first node has received the tenth message and if the tenth message includes an indication that the second node has successfully received the fifth message, and, subsequently, a link failure is detected by the first node, the first node communicating with the second node at the second data rate, and (u) if the second node has received the eighth message and if the eighth message includes an indication that the first node has successfully received the sixth message, and, subsequently, a link failure is detected by the second node, the second node communicating with the first node at the second data rate.

Preferably, the method of includes the further steps of: (v) if a first predetermined timeout period elapses without the second node receiving a valid capabilities advertisement message from the first node, the second node operating at the first data rate, and (w) if a second predetermined timeout period elapses without the first node receiving a valid capabilities advertisement message from the second node, the first node operating at the first data rate.

Preferably, the method includes the further step of: (v) performing at least one action selected from the group consisting of the action of the first node including in the first message, and, if the fourth message is transmitted, in the fourth message, an indication of a first number of transmission parameter settings that the first node will use to transmit the fifth message, and the second node including in the tenth message, and, if the eleventh message is transmitted, in the eleventh message an indication of which of the first number of transmission parameter settings the first node is to utilize when transmitting data to the second node at the second data rate, and the action of the second node including in the second message, and, if the third message is transmitted, in the third message, an indication of a second number of transmission parameter settings that the second node will use to transmit the sixth message, and the first node including in the eighth message, and, if the twelfth message is transmitted, in the twelfth message an indication of which of the second number of transmission parameter settings the second node is to utilize when transmitting data to the first node at the second data rate.

Preferably the method of includes the further step of: (v) performing at least one action selected from the group consisting of the action of the first node including in the first message, and, if the fourth message is transmitted, in the fourth message, an indication of a first number of reception parameter settings that the first node will use to receive the sixth message, and the second node repeating at least a portion of the sixth message according to the first number of reception parameter settings, and the first node selecting reception parameter settings for subsequent reception of user data at the second data rate according to reception performance while receiving the sixth message, and the action of the second node including in the second message, and, if the third message is transmitted, in the third message, an indication of a second number of reception parameter settings that the second node will use to receive the fifth message, and the first node repeating at least a portion of the fifth message according to the second number of reception parameter settings, and the second node selecting reception parameter settings for subsequent reception of user data at the second data rate according to reception performance while receiving the fifth message.

Preferably in method at least a portion of a message selected from the group consisting of the fifth message and the sixth message is operative to allow a receiver to distinguish a message transmitted via Active Cable from a message transmitted via copper cable.

According to the present invention there is provided a system for digital communication including: (a) a first node; (b) a second node, and (c) a communication medium operative to transmit messages from the first node to the second node and from the second node to the first node, and wherein: (i) the first node is operative to transmit a first message to the second node, the first message including an indication of whether the first node is capable of operating at a predetermined second data rate; (ii) the second node is operative to transmit a second message to the first node, the second message including an indication of whether the second node is capable of operating at the second data rate; (iii) if the first message is received by the second node and the indication of whether the first node is capable of operating at the second data rate is negative, the second node is operative to operate at the first data rate; (iv) if the first message is received by the second node and the indication of whether the first node is capable of operating at the second data rate is positive, the second node is operative to transmit to the first node a third message, the third message including an indication of whether the second node is capable of operating at the second data rate, the third message further including an acknowledgement code; (v) if the second message is received by the first node and the indication of whether the second node is capable of operating at the second data rate is negative, the first node is operative to operate at the first data rate; (vi) if the second message is received by the first node and the indication of whether the second node is capable of operating at the second data rate is positive, the first node is operative to transmit to the second node a fourth message, the fourth message including an indication of whether the first node is capable of operating at the second data rate, the fourth message further including an acknowledgement code; (vii) if the third message is received by the first node, and if the indication of whether the second node is capable of operating at the second data rate is positive, the first node is operative to transmit to the second node, at the second data rate, a fifth message; (viii) if the fourth message is received by the second node, and if the indication of whether the first node is capable of operating at the second data rate is positive, the second node is operative to transmit to the first node, at the second data rate, a sixth message; (ix) if the first node has received the second message and the indication of whether the second node is capable of operating at the second data rate is positive, and, subsequently, a link failure is detected by the first node, the first node is operative to transmit to the second node, at the second data rate, the fifth message; (x) if the second node has received the first message and the indication of whether the first node is capable of operating at the second data rate is positive, and, subsequently, a link failure is detected by the second node, the second node is operative to transmit to the first node, at the second data rate, the sixth message; (xi) if the first node has received the sixth message, and the first node has determined that no portion of the sixth message satisfies a first predetermined quality criterion, the first node is operative to transmit to the second node, at the first data rate, a seventh message, the seventh message including an indication that the first node has not successfully received the sixth message, the first node being further operative to continue communication with the second node at the first data rate; (xii) if the first node has received the sixth message, and the first node has determined that at least one portion of the sixth message satisfies the first quality criterion, the first node is operative to transmit to the second node, at the first data rate, an eighth message, the eight message including an indication that the first node has successfully received the sixth message; (xiii) if the second node has received the fifth message, and the second node has determined that no portion of the fifth message satisfies a second predetermined quality criterion, the second node is operative to transmit to the first node, at the first data rate, a ninth message, the ninth message including an indication that the second node has not successfully received the fifth message, the second node being further operative to continue communication with the first node at the first data rate; (xiv) if the second node has received the fifth message, and the second node has determined that at least one portion of the fifth message satisfies the second quality criterion, the second node is operative to transmit to the first node, at the first data rate, a tenth message, the tenth message including an indication that the second node has successfully received the fifth message; (xv) if the eighth message is received by the second node and the eighth message includes an indication that the first node has received the sixth message successfully, the second node is operative to transmit to the first node an eleventh message, the eleventh message including an indication that the second node has successfully received the fifth message, the eleventh message further including an acknowledgement code; (xvi) if the tenth message is received by the first node and the tenth message includes an indication that the second node has received the fifth message successfully, the first node is operative to transmit to the second node a twelfth message, the twelfth message including an indication that the first node has successfully received the sixth message, the twelfth message further including an acknowledgement code; (xvii) if the eleventh message is received by the first node, and if the eleventh message includes an indication that the second node has successfully received the fifth message, the first node is operative to communicate with the second node at the second data rate; (xviii) if the twelfth message is received by the second node, and if the twelfth message includes an indication that the first node has successfully received the sixth message, the second node is operative to communicate with the first node at the second data rate; (xix) if the first node has received the tenth message and if the tenth message includes an indication that the second node has successfully received the fifth message, and, subsequently, a link failure is detected by the first node, the first node is operative to communicate with the second node at the second data rate, and (xx) if the second node has received the eighth message and if the eighth message includes an indication that the first node has successfully received the sixth message, and, subsequently, a link failure is detected by the second node, the second node is operative to communicate with the first node at the second data rate.

Preferably in the system if a first predetermined timeout period elapses without the second node receiving a valid capabilities advertisement message from the first node, the second node is operative to operate at the first data rate, and, if a second predetermined timeout period elapses without the first node receiving a valid capabilities advertisement message from the second node, the first node is operative to operate at the first data rate.

Preferably in the system the first node is operative to include in the first message, and, if the fourth message is transmitted, in the fourth message, an indication of a first number of transmission parameter settings that the first node will use to transmit the fifth message, and wherein the second node is operative to including in the tenth message, and, if the eleventh message is transmitted, in the eleventh message an indication of which of the first number of transmission parameter settings the first node is to utilize when transmitting data to the second node at the second data rate, and wherein the second node is operative to include in the second message, and, if the third message is transmitted, in the third message, an indication of a second number of transmission parameter settings that the second node will use to transmit the sixth message, and wherein the first node is operative to include in the eighth message, and, if the twelfth message is transmitted, in the twelfth message an indication of which of the second number of transmission parameter settings the second node is to utilize when transmitting data to the first node at the second data rate.

Preferably in the system the first node is operative to including in the first message, and, if the fourth message is transmitted, in the fourth message, an indication of a first number of reception parameter settings that the first node will use to receive the sixth message, and wherein the second node is operative to repeat at least a portion of the sixth message according to the first number of reception parameter settings, and wherein the first node is operative to selecting reception parameter settings for subsequent reception of user data at the second data rate according to reception performance while receiving the sixth message, and wherein the second node is operative to include in the second message, and, if the third message is transmitted, in the third message, an indication of a second number of reception parameter settings that the second node will use to receive the fifth message, and wherein the first node is operative to repeat at least a portion of the fifth message according to the second number of reception parameter settings, and wherein the second node is operative to selecting reception parameter settings for subsequent reception of user data at the second data rate according to reception performance while receiving the fifth message.

Preferably in the system at least a portion of a message selected from the group consisting of the fifth message and the sixth message is operative to allow a receiver to distinguish a message transmitted via Active Cable from a message transmitted via copper cable.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a digital communication method wherein two communicating nodes exchange information at the beginning of a communication session so as to enable optimal performance of the communication link in light of the capabilities of the two nodes and their environment.

Specifically, the present invention can be used to automatically negotiate the transmission speed and adjust the transmission and reception parameters used in a digital communication link, such as a link of an InfiniBand fabric. The protocol of the present invention provides for compatibility between newer equipment capable of higher data rates and older equipment that can only operate at lower data rates. The protocol of the present invention also accommodates the connection of a device operating according to the protocol of the present invention with a device not operating according to the protocol of the present invention, although the connection may be at a lower data rate than would be the case for a connection between two devices both operating according to the present invention.

The principles and operation of a communication method according to the present invention may be better understood with reference to the drawings and the accompanying description.

Figure 1:
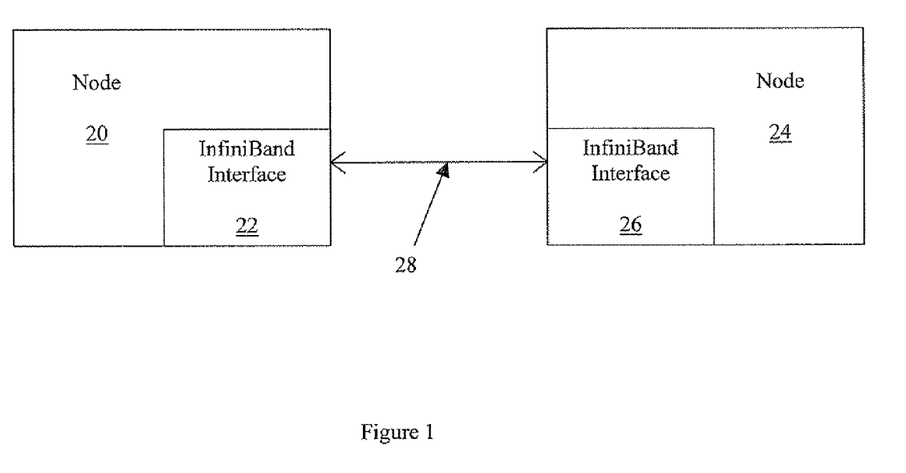
FIG. 1 is a high-level block diagram of two nodes communicating according to the method of the present invention.
Figure 2:
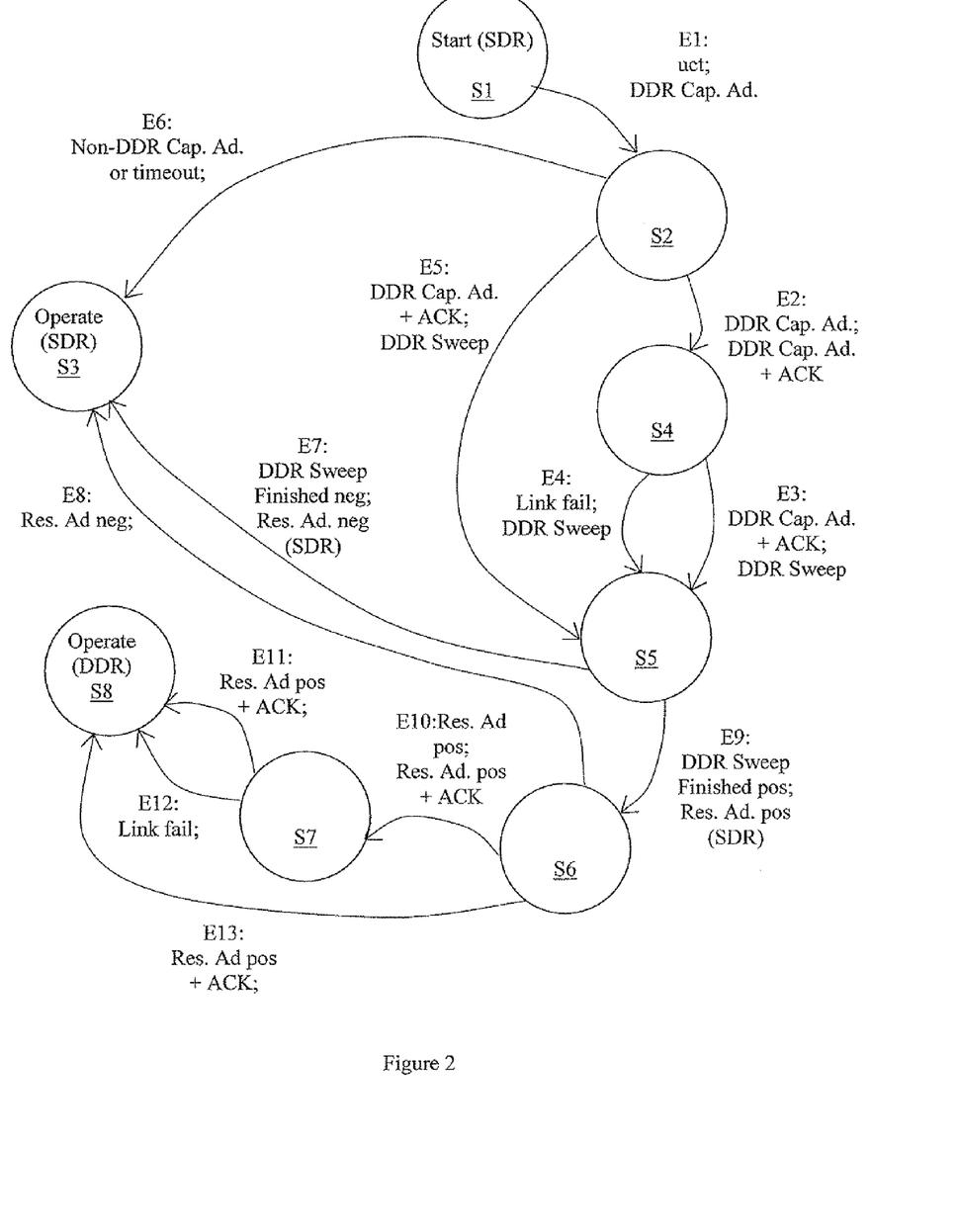
FIG. 2 is a state diagram of a node according to the present invention.

Referring now to the drawings, FIG. 1 is a high-level block diagram of a communication system operating according to the method of the present invention. FIG. 2 is a high-level state diagram illustrating the operation of a node according to the present invention.

In FIG. 2, states are labeled with identifiers such as S1 or S2, and edges by identifiers such as E1 or E2. Edge labels also indicate the input that causes the transition, and the output produced by the transition, if any. "uct" means unconditional transfer. The format for an edge label is identifier:input; output.

The figures and the following description provide only an illustrative example of the present invention, and one skilled in the art will be aware that many variations are possible within the scope of the present invention.

The autonegotiation protocol of the present inventions begins at a state S1 wherein a communication link is established between a first node 20 and a second node 24 at a first data rate. In a preferred embodiment of the present invention this first data rate is the InfiniBand SDR rate of 2.5 Gbps.

Although InfiniBand links are often bundled together to provide higher data rates, the present discussion only considers a single link.

After a link has been established at the first data rate each node that operates according to the present invention transmits to the other node a capability advertisement message including an indication of whether the transmitting node is capable of operating at a second, preferably higher, data rate. Preferably, this second data rate is the InfiniBand DDR rate of 5 Gbps. Preferably, each capability advertisement message further includes an indication of the number of trial transmission parameter settings the node transmitting the capability advertisement message will use when testing communication with the other node at the second data rate. Preferably, each capability advertisement message still further includes an indication of the number of trial reception parameter settings the node transmitting the capability advertisement message will use when testing communication with the other node at the second data rate.

After transmitting a capability advertisement message, the node switches to state S2 via edge E1.

If the node is not capable of operating at the second data rate, or the node receives a capability advertisement message from the other node indicating that the other node is not capable of operating at the second data rate, or the node does not receive a capability advertisement message within a predetermined timeout period, then the node switches to state S3 via edge E6 and continues to operate at the first data rate and no further attempt is made to operate at the second data rate.

If a node in state S2 receives from the other node a capability advertisement message indicating that the other node is capable of operating at the second data rate and does not include an acknowledgement code the node again transmits to the other node a capability advertisement message which further includes an acknowledgement code, and switches to state S4 via edge E2.

If a node in state S2 receives from the other node a capability advertisement message indicating that the other node is capable of operating at the second data rate and includes an acknowledgement code the node transmits, at the second data rate, at least one test message, and switches to state S5 via edge E5.

If a node in state S4 receives from the other node a capability advertisement message indicating that the other node is capable operating at the second data rate and includes an acknowledgement code, or, if a node in state S4 detects a link failure, the node transmits, at the second data rate, at least one test message, and switches to state S5 via link E3 if the transition is due to an acknowledgement message, or via link E4 if the transition is due to a link failure. For a node in state S4, a link failure most likely results from the other node having already begun to transmit a test message at the second data rate. Transmissions at the second data rate are interpreted by a node operating at the first data rate as a link failure. Thus, a node in state S4 that has detected a link failure can assume that the other node is transmitting a test message at the second data rate and the node can begin receiving that test message at the second data rate. In order to assure accurate results received data are included in the measurement for a period of time shorter than the time during which the message is transmitted. Thus, reception data are gathered only when the transmission is stable.

If capability advertisement messages transmitted by both nodes indicate that both nodes are capable of operating at the second data rate and if a capability advertisement message of at least one node includes an indication that that node can transmit with more than one transmission parameter setting, and/or more than one reception parameter setting, then test messages will be repeated so as to accommodate testing of the various possible combinations of transmission and reception parameter settings for both directions of transmission.

For example, if the first node has indicated that the first node can transmit at the second data rate with M different transmission parameter settings and can receive at the second data rate with N different reception parameter settings, and the second node has indicated that the second node can transmit at the second data rate with P different transmission parameter settings and can receive at the second data rate with Q different reception parameter settings, the first node will transmit MQ copies of a test message, and the second node will transmit NP copies of a test message, i.e., each node transmits a test message a number of times equal to the product of the number of trial transmission parameter settings that node is using and the number of trial reception parameter settings the other node is using, such that each node attempts to receive a test message using all possible combinations of the various trial transmission parameter settings the other node is using and the various trial reception parameters the node is using.

For copper cable there are typically several transmission and reception parameter settings that should be tried in order to optimize link performance. On the other hand, there is typically only a single set of transmission and reception parameter settings that are optimal for Active Cable. Furthermore, distinguishing Active Cable from copper cable is aided by the use of a particular set of transmission and reception parameters that are generally not the same as the parameter settings that are optimal for transmission of user data.

The time allocated by both nodes for the transmission of test messages at the second data rate is long enough for both nodes to finish transmitting and receiving test messages in all the combinations described above. I.e., in the example above the testing time will be proportional to max(MQ, NP).

For ease of implementation it may be desirable to perform testing where each node takes the same amount of time for cycling through reception parameter settings before changing the transmission parameter settings. If that is the case, the testing time will be proportional to (max(MQ))(max(NP)).

In addition, if testing for Active Cable is to be performed, time for two more tests must be allocated for testing with the parameter settings capable of distinguishing Active Cable from copper cable, and with parameter settings optimized for use with Active Cable carrying user data. In this case, the testing times corresponding to the above-mentioned testing procedures is proportional to max(MQ, NP)+2, and (max (MQ))(max(NP))+2, respectively.

Each node records an indication of a preferred reception parameter setting for that node and a preferred transmission parameter setting for the other node for use at the second data rate.

A node in state S5 that has found that no combination of reception parameter settings for that node and transmission parameter settings for the other node results in satisfactory reception at that node transmits to the other node, at the first data rate, a result advertisement message indicating that communication at the second data rate is not possible, and switches to state S3 via edge E7 and communicates with the other node at the first data rate.

A node in state S5 that has found a at least one combination of reception parameter settings for that node and transmission parameter settings for the other node that results in satisfactory reception at that node transmits to the other node, at the first data rate, a results advertisement message indicating that the node is capable of satisfactorily receiving data from the other node at the second data rate. Preferably, this results advertisement message includes an indication of the preferred transmission parameter setting for the other node. Preferably, if reception with the transmission and reception parameter settings operative to distinguish Active Cable from copper cable indicates that Active Cable is in use, and reception with the transmission and reception parameters optimized for use with user data over Active Cable is adequate, the results advertisement message indicates that transmission with parameter settings optimized for use with user data over Active Cable is preferred. The node now switches to state S6 via edge E9, wherein bidirectional communication continues at the first data rate.

A node in state 86 that receives a result advertisement message indicating that the other node is not capable of receiving at the second data rate switches to state S3 via edge E8 and communicates with the other node at the first data rate.

A node in state S6 that receives a result advertisement message indicating that the other node is capable of receiving at the second data rate and does not include an acknowledgement code the node again transmits to the other node a results advertisement message which further includes an acknowledgement code. Preferably, the results advertisement message still further includes an indication of the preferred transmission parameter setting for the other node. The node now switches to state S7 via edge E10.

If a node in state 86 receives from the other node a results advertisement message indicating that the other node is capable of receiving at the second data rate and includes an acknowledgement code the node switches to state S8 via edge E13, wherein the node establishes communication with the other node at the second data rate. If the results advertisement message includes an indication of a preferred transmission parameter setting, the node uses this setting for transmission to the other node. If the results advertisement message indicates that Active cable is in use and that reception with the Active Cable parameters optimized for use with user data over Active Cable, then the optimized Active cable parameters are used for transmission.

If a node in state S7 receives from the other node a results advertisement message indicating that the other node is capable receiving at the second data rate and includes an acknowledgement code, or, if a node in state S7 detects a link failure, the node switches to state S8 via edge E11 if the transition is due to an acknowledgement message, or via edge E12 if the transition is due to a link failure, wherein the node establishes communication with the other node at the second data rate. If the results advertisement message includes an indication of a preferred transmission parameter setting, the node uses this setting for transmission to the other node. Similarly to the situation described above for a node in state S4, detection by a node in state S7 of a link failure most likely results from the other node having already begun to try to establish communication at the second data rate. Transmissions at the second data rate are interpreted by a node operating at the first data rate as a link failure. Thus, a node in state 87 that has detected a link failure can assume that the other node is trying to establish communication at the second data rate and the node can now try to establish communication with the other node at the second data rate.

While the invention has been described with respect to a limited number of embodiments, it will be appreciated that many variations, modifications and other applications of the invention may be made.

What is claimed is:

1. A method of digital communication comprising the steps of:
   (a) establishing a digital communication session between a first node and a second node at a predetermined first data rate;
   (b) said first node transmitting a first message to said second node, said first message including an indication of whether said first node is capable of operating at a predetermined second data rate;
   (c) said second node transmitting a second message to said first node, said second message including an indication of whether said second node is capable of operating at said second data rate;
   (d) if said first message is received by said second node and said indication of whether said first node is capable of operating at said second data rate is negative, said second node operating at said first data rate;
   (e) if said first message is received by said second node and said indication of whether said first node is capable of operating at said second data rate is positive, said second node transmitting to said first node a third message, said third message including an indication of whether said second node is capable of operating at said second data rate, said third message further including an acknowledgement code;
   (f) if said second message is received by said first node and said indication of whether said second node is capable of operating at said second data rate is negative, said first node operating at said first data rate;
   (g) if said second message is received by said first node and said indication of whether said second node is capable of operating at said second data rate is positive, said first node transmitting to said second node a fourth message, said fourth message including an indication of whether said first node is capable of operating at said second data rate, said fourth message further including an acknowledgement code;

(h) if said third message is received by said first node, and if said indication of whether said second node is capable of operating at said second data rate is positive, said first node transmitting to said second node, at said second data rate, a fifth message;

(i) if said fourth message is received by said second node, and if said indication of whether said first node is capable of operating at said second data rate is positive, said second node transmitting to said first node, at said second data rate, a sixth message;

(j) if said first node has received said second message and said indication of whether said second node is capable of operating at said second data rate is positive, and, subsequently, a link failure is detected by said first node, said first node transmitting to said second node, at said second data rate, said fifth message;

(k) if said second node has received said first message and said indication of whether said first node is capable of operating at said second data rate is positive, and, subsequently, a link failure is detected by said second node, said second node transmitting to said first node, at said second data rate, said sixth message;

(l) if said first node has received said sixth message, and said first node has determined that no portion of said sixth message satisfies a first predetermined quality criterion, said first node transmitting to said second node, at said first data rate, a seventh message, said seventh message including an indication that said first node has not successfully received said sixth message, said first node continuing communication with said second node at said first data rate;

(m) if said first node has received said sixth message, and said first node has determined that at least one portion of said sixth message satisfies said first quality criterion, said first node transmitting to said second node, at said first data rate, an eighth message, said eighth message including an indication that said first node has successfully received said sixth message;

(n) if said second node has received said fifth message, and said second node has determined that no portion of said fifth message satisfies a second predetermined quality criterion, said second node transmitting to said first node, at said first data rate, a ninth message, said ninth message including an indication that said second node has not successfully received said fifth message, said second node continuing communication with said first node at said first data rate;

(o) if said second node has received said fifth message, and said second node has determined that at least one portion of said fifth message satisfies said second quality criterion, said second node transmitting to said first node, at said first data rate, a tenth message, said tenth message including an indication that said second node has successfully received said fifth message;

(p) if said eighth message is received by said second node and said eighth message includes an indication that said first node has received said sixth message successfully, said second node transmitting to said first node an eleventh message, said eleventh message including an indication that said second node has successfully received said fifth message, said eleventh message further including an acknowledgement code;

(q) if said tenth message is received by said first node and said tenth message includes an indication that said second node has received said fifth message successfully, said first node transmitting to said second node a twelfth message, said twelfth message including an indication that said first node has successfully received said sixth message, said twelfth message further including an acknowledgement code;

(r) if said eleventh message is received by said first node, and if said eleventh message includes an indication that said second node has successfully received said fifth message, said first node communicating with said second node at said second data rate;

(s) if said twelfth message is received by said second node, and if said twelfth message includes an indication that said first node has successfully received said sixth message, said second node communicating with said first node at said second data rate;

(t) if said first node has received said tenth message and if said tenth message includes an indication that said second node has successfully received said fifth message, and, subsequently, a link failure is detected by said first node, said first node communicating with said second node at said second data rate, and (u) if said second node has received said eighth message and if said eighth message includes an indication that said first node has successfully received said sixth message, and, subsequently, a link failure is detected by said second node, said second node communicating with said first node at said second data rate.

2. The method of claim 1, comprising the further steps of:
(v) if a first predetermined timeout period elapses without said second node receiving a valid capabilities advertisement message from said first node, said second node operating at said first data rate, and
(w) if a second predetermined timeout period elapses without said first node receiving a valid capabilities advertisement message from said second node, said first node operating at said first data rate.

3. The method of claim 1, comprising the further step of:
(v) performing at least one action selected from the group consisting of the action of said first node including in said first message, and, if said fourth message is transmitted, in said fourth message, an indication of a first number of transmission parameter settings that said first node will use to transmit said fifth message, and said second node including in said tenth message, and, if said eleventh message is transmitted, in said eleventh message an indication of which of said first number of transmission parameter settings said first node is to utilize when transmitting data to said second node at said second data rate, and the action of said second node including in said second message, and, if said third message is transmitted, in said third message, an indication of a second number of transmission parameter settings that said second node will use to transmit said sixth message, and said first node including in said eighth message, and, if said twelfth message is transmitted, in said twelfth message an indication of which of said second number of transmission parameter settings said second node is to utilize when transmitting data to said first node at said second data rate.

4. The method of claim 1, comprising the further step of:
(v) performing at least one action selected from the group consisting of the action of said first node including in said first message, and, if said fourth message is transmitted, in said fourth message, an indication of a first number of reception parameter settings that said first node will use to receive said sixth message, and said second node repeating at least a portion of said sixth message according to said first number of reception parameter settings, and said first node selecting reception parameter settings for subsequent reception of user data at said second data rate according to reception performance while receiving said sixth message, and the action of said second node including in said second message, and, if said third message is transmitted, in said third message, an indication of a second number of reception parameter settings that said second node will use to receive said fifth message, and said first node repeating at least a portion of said fifth message according to said second number of reception parameter settings, and said second node selecting reception parameter settings for subsequent reception of user data at said second data rate according to reception performance while receiving said fifth message.

5. The method of claim 1, wherein at least a portion of a message selected from the group consisting of said fifth message and said sixth message is operative to allow a receiver to distinguish a said message transmitted via Active Cable from a said message transmitted via copper cable.

6. A system for digital communication comprising:
(a) a first node;
(b) a second node, and
(c) a communication link operative to transmit messages from said first node to said second node and from said second node to said first node, and wherein:
  (i) said first node is operative to transmit a first message to said second node, said first message including an indication of whether said first node is capable of operating at a predetermined second data rate;
  (ii) said second node is operative to transmit a second message to said first node, said second message including an indication of whether said second node is capable of operating at said second data rate;
  (iii) if said first message is received by said second node and said indication of whether said first node is capable of operating at said second data rate is negative, said second node is operative to operate at said first data rate;
  (iv) if said first message is received by said second node and said indication of whether said first node is capable of operating at said second data rate is positive, said second node is operative to transmit to said first node a third message, said third message including an indication of whether said second node is capable of operating at said second data rate, said third message further including an acknowledgement code;
  (v) if said second message is received by said first node and said indication of whether said second node is capable of operating at said second data rate is negative, said first node is operative to operate at said first data rate;
  (vi) if said second message is received by said first node and said indication of whether said second node is capable of operating at said second data rate is positive, said first node is operative to transmit to said second node a fourth message, said fourth message including an indication of whether said first node is capable of operating at said second data rate, said fourth message further including an acknowledgement code;
  (vii) if said third message is received by said first node, and if said indication of whether said second node is capable of operating at said second data rate is positive, said first node is operative to transmit to said second node, at said second data rate, a fifth message;
  (viii) if said fourth message is received by said second node, and if said indication of whether said first node is capable of operating at said second data rate is positive, said second node is operative to transmit to said first node, at said second data rate, a sixth message;
  (ix) if said first node has received said second message and said indication of whether said second node is capable of operating at said second data rate is positive, and, subsequently, a link failure is detected by said first node, said first node is operative to transmit to said second node, at said second data rate, said fifth message;
  (x) if said second node has received said first message and said indication of whether said first node is capable of operating at said second data rate is positive, and, subsequently, a link failure is detected by said second node, said second node is operative to transmit to said first node, at said second data rate, said sixth message;
  (xi) if said first node has received said sixth message, and said first node has determined that no portion of said sixth message satisfies a first predetermined quality criterion, said first node is operative to transmit to said second node, at said first data rate, a seventh message, said seventh message including an indication that said first node has not successfully received said sixth message, said first node being further operative to continue communication with said second node at said first data rate;
  (xii) if said first node has received said sixth message, and said first node has determined that at least one portion of said sixth message satisfies said first quality criterion, said first node is operative to transmit to said second node, at said first data rate, an eighth message, said eighth message including an indication that said first node has successfully received said sixth message;
  (xiii) if said second node has received said fifth message, and said second node has determined that no portion of said fifth message satisfies a second predetermined quality criterion, said second node is operative to transmit to said first node, at said first data rate, a ninth message, said ninth message including an indication that said second node has not successfully received said fifth message, said second node being further operative to continue communication with said first node at said first data rate;
  (xiv) if said second node has received said fifth message, and said second node has determined that at least one portion of said fifth message satisfies said second quality criterion, said second node is operative to transmit to said first node, at said first data rate, a tenth message, said tenth message including an indication that said second node has successfully received said fifth message;
  (xv) if said eighth message is received by said second node and said eighth message includes an indication that said first node has received said sixth message successfully, said second node is operative to transmit to said first node an eleventh message, said eleventh message including an indication that said second node has successfully received said fifth message, said eleventh message further including an acknowledgement code;

(xvi) if said tenth message is received by said first node and said tenth message includes an indication that said second node has received said fifth message successfully, said first node is operative to transmit to said second node a twelfth message, said twelfth message including an indication that said first node has successfully received said sixth message, said twelfth message further including an acknowledgement code;

(xvii) if said eleventh message is received by said first node, and if said eleventh message includes an indication that said second node has successfully received said fifth message, said first node is operative to communicate with said second node at said second data rate;

(xviii) if said twelfth message is received by said second node, and if said twelfth message includes an indication that said first node has successfully received said sixth message, said second node is operative to communicate with said first node at said second data rate;

(xix) if said first node has received said tenth message and if said tenth message includes an indication that said second node has successfully received said fifth message, and, subsequently, a link failure is detected by said first node, said first node is operative to communicate with said second node at said second data rate, and (xx) if said second node has received said eighth message and if said eighth message includes an indication that said first node has successfully received said sixth message, and, subsequently, a link failure is detected by said second node, said second node is operative to communicate with said first node at said second data rate.

7. The system of claim 6, wherein, if a first predetermined timeout period elapses without said second node receiving a valid capabilities advertisement message from said first node, said second node is operative to operate at said first data rate, and, if a second predetermined timeout period elapses without said first node receiving a valid capabilities advertisement message from said second node, said first node is operative to operate at said first data rate.

8. The system of claim 6, wherein said first node is operative to include in said first message, and, if said fourth message is transmitted, in said fourth message, an indication of a first number of transmission parameter settings that said first node will use to transmit said fifth message, and wherein said second node is operative to including in said tenth message, and, if said eleventh message is transmitted, in said eleventh message an indication of which of said first number of transmission parameter settings said first node is to utilize when transmitting data to said second node at said second data rate, and wherein said second node is operative to include in said second message, and, if said third message is transmitted, in said third message, an indication of a second number of transmission parameter settings that said second node will use to transmit said sixth message, and wherein said first node is operative to include in said eighth message, and, if said twelfth message is transmitted, in said twelfth message an indication of which of said second number of transmission parameter settings said second node is to utilize when transmitting data to said first node at said second data rate.

9. The system of claim 6, wherein said first node is operative to including in said first message, and, if said fourth message is transmitted, in said fourth message, an indication of a first number of reception parameter settings that said first node will use to receive said sixth message, and wherein said second node is operative to repeat at least a portion of said sixth message according to said first number of reception parameter settings, and wherein said first node is operative to selecting reception parameter settings for subsequent reception of user data at said second data rate according to reception performance while receiving said sixth message, and wherein said second node is operative to include in said second message, and, if said third message is transmitted, in said third message, an indication of a second number of reception parameter settings that said second node will use to receive said fifth message, and wherein said first node is operative to repeat at least a portion of said fifth message according to said second number of reception parameter settings, and wherein said second node is operative to selecting reception parameter settings for subsequent reception of user data at said second data rate according to reception performance while receiving said fifth message.

10. The system of claim 6, wherein at least a portion of a message selected from the group consisting of said fifth message and said sixth message is operative to allow a receiver to distinguish a said message transmitted via Active Cable from a said message transmitted via copper cable.

* * * * *